United States Patent
Nashiki et al.

[11] Patent Number: 6,121,706
[45] Date of Patent: Sep. 19, 2000

[54] RELUCTANCE MOTOR

[75] Inventors: Masayuki Nashiki; Takanori Yokochi, both of Niwa-gun, Japan

[73] Assignee: Okuma Corporation, Nagoya, Japan

[21] Appl. No.: 09/356,452

[22] Filed: Jul. 19, 1999

[30] Foreign Application Priority Data

Jul. 23, 1998 [JP] Japan .................................. 10-208442

[51] Int. Cl.[7] .................................................. H02K 17/42
[52] U.S. Cl. ......................... 310/168; 310/152; 310/156; 310/162; 310/166; 310/261; 310/269
[58] Field of Search .................................... 310/168, 152, 310/156, 162, 166, 261, 269

[56] References Cited

U.S. PATENT DOCUMENTS

| | | | |
|---|---|---|---|
| 4,139,790 | 2/1979 | Steen | 310/156 |
| 5,296,773 | 3/1994 | El-Antably et al. | 310/261 |
| 5,304,882 | 4/1994 | Lipo et al. | 310/156 |
| 5,378,953 | 1/1995 | Uchida et al. | 310/156 |
| 5,510,662 | 4/1996 | Tanimoto et al. | 310/156 |
| 5,903,079 | 5/1999 | Iwata et al. | 310/156 |

Primary Examiner—Nestor Ramirez
Assistant Examiner—Thanh Lam
Attorney, Agent, or Firm—Oliff & Berridge, PLC

[57] ABSTRACT

A reluctance motor is provided that reduces leaking magnetic flux. To generate magnetic flux between adjacent magnetic poles in a rotor 2, permanent magnets 4 are disposed in approximate centers of split magnetic paths near a borderline area between two magnetic poles in an internal portion of the rotor. Further, each of slots 8 in a stator 1 is wound with a coil of a corresponding phase such that the vector phase and amplitude expressed by the products of the number of coil turns and the amount of passing current, namely, ampere-turns, become almost identical for each of the slots. By reducing leaking magnetic flux according to this arrangement, generated torque can be increased. As the rotor mechanical strength is enhanced, the rotor can be safely driven at a higher speed. A practical motor is obtained that simultaneously achieves improved motor characteristics and reduced torque ripples.

9 Claims, 20 Drawing Sheets

RELUCTANCE MOTOR

BACKGROUND OF THE INVENTION

1. Field of the Invention

The present invention relates to a reluctance motor, and particularly to a rotor structure thereof.

2. Description of the Background Art

Among motors presently used in many technical fields, there are motors that comprise a rotor formed of a material having high magnetic permeability rather than of a permanent magnet, and having a rotor cross-sectional structure such as shown in FIG. 15 wherein a plurality of nearly-insulated split magnetic paths are disposed between adjacent poles. Such motors are known as reluctance motors. As illustrated in FIG. 15, a rotor 2 of a typical reluctance motor is provided with a plurality of slits 3, in addition to a hole for receiving a motor shaft 5. These slits 3 serve as the basis for forming magnetic paths in the rotor 2. Specifically, as known in the conventional art, when electric current is made to flow in coils wound in slots 8 (FIG. 17) of a stator surrounding the rotor 2, magnetic flux is generated between the energized coils in the direction according to the right-hand rule. As the rotor 2 is formed of a material having high magnetic permeability, the magnetic flux passes through the rotor 2. Air is present in the slits 3, and, as known, magnetic permeability of air is extremely low compared with that of a high magnetic permeability material. When the slits 3 are formed in the rotor 2, magnetic flux passes via magnetic paths located between the slits 3 of the rotor 2 (FIG. 16). In light of the above, when, for example, electric current is made to flow in coils located in direction d indicated by dotted lines in FIG. 16, magnetic flux can be generated as illustrated by dot-and-segment arrows in FIG. 16 if the slits 3 are formed in the rotor 2.

When energizing the coils and forming desired magnetic flux as described above, it would be ideal if all magnetic flux from the N pole to the S pole is formed along the plurality of split magnetic paths between the slits 3, as shown in FIG. 16. However, in reality, this is not the case. Specifically, a current must be made to flow not just in the coils located in direction d in FIG. 16, but also in coils located in direction q to provide rotational force to the rotor 2. In practice, as known, a current formed by vector synthesis of these currents are made to flow in each of the coils. Accordingly, in such states as shown in FIG. 16, magnetic flux is generated in a peripheral portion 7 of the rotor 2 and in a direction perpendicular to the slits 3 in the rotor 2, for example, as illustrated in FIG. 17. These magnetic fluxes do not function to form magnetic poles in the rotor 2 but form magnetic flux leaks. In FIG. 17, although only two lines of magnetic flux leaks are indicated as typical examples, many magnetic flux leaks actually exist in various directions. When magnetic flux leaks are generated, the total magnetic flux may shift the N poles and S poles from the positions indicated in FIG. 16, causing the unfavorable decrease in generated torque.

Further, the following problem is present in the structure wherein each slit 3 is continuous from one end to the other. In such a structure, each split magnetic path of the rotor 2 is supported only at extremely thin portions indicated as the periphery portion 7 of the rotor. When the rotor 2 rotates, this thin portion may not be able to withstand the centrifugal force generated on the rotor 2, and may thus deform or break. It is therefore necessary to include measures against the centrifugal force when deciding the shape of the slits 3 in the rotor 2. One example of a conventionally proposed measures is the shape shown in FIG. 18. FIG. 18 illustrates a cross-sectional shape of a rotor similar to FIG. 15, but it differs from FIG. 15 in that the slits 3 are interrupted once along the halfway of the split magnetic paths, and portions connecting adjacent split magnetic paths are formed. The portions that mechanically link the split magnetic paths to one another as described above are referred hereinafter as connecting portions. As shown in FIG. 18, by including the connection portions 6, a strong structure is provided that can withstand the centrifugal force. Although a variety of other widths, shapes, locations, and numbers of connecting portions 6 are possible, the following explanation will be based on the example of FIG. 18.

Leaking magnetic flux is increased in the example of FIG. 18 because leaking magnetic flux generates, not just in the periphery portion 7 of the rotor 2 and in the direction perpendicular to the slits 3, but additionally along the connecting portions 6, as shown in FIG. 19. This situation results in further decrease in generated torque.

As generation of magnetic flux leaks result in decrease of output torque, it is most preferable if magnetic flux leaks are minimized. Accordingly, it is theoretically desirable that connecting portions 6 and the periphery portions 7 do not exist. However, as explained above, the connection portions 6 and the periphery portions 7 are mechanically required with respect to the centrifugal force generated on the rotor 2. These contradicting requirements must be somehow fulfilled. Conventionally, for example, a rotor structure as shown in FIG. 20 was devised wherein permanent magnets 4A are disposed near the periphery portion 7 of a rotor 2 without connecting portions 6. This structure was intended to eliminate leaking magnetic flux in connecting portions 6, and to reduce leaking magnetic flux in the periphery portion 7 through magnetic saturation provided by the permanent magnets 4A. Such an arrangement, however, presented more difficult conditions relating to centrifugal force because, further to the difficulty of withstanding centrifugal force only by the mechanical strength of the periphery portion 7, additional centrifugal force is generated by the permanent magnets 4A,.

One object of the present invention is to solve the problem of decrease in generated torque due to magnetic flux leaks at the connecting portions 6.

Another problem to be addressed is that, as the internal shape of the rotor is rather complex, rotor mechanical strength is insufficient. A new rotor structure is necessary which can withstand the centrifugal force generated on respective portions of the rotor and the reaction force of the torque generated by the reluctance motor.

A further problem exists when many expensive permanent magnets are used, as in the example of FIG. 20. Overall cost increases with the costs of permanent magnets and the costs for assembling those magnets.

Another problem is the unfavorable increase of torque ripples which result from disposing permanent magnets on the internal portions of the rotor or from taking measures to increase rotor mechanical strength.

A further problem is the insufficient rotor mechanical strength due to the many empty portions inside the rotor structure. Although the shapes shown in the above-mentioned Figures can be used for general applications, further strengthening of the rotor structure is necessary for particular applications wherein a strong impact may be applied.

The purpose of the present invention is to simultaneously solve the above problems and provide a practical reluctance motor. The required conditions of a practical motor for general applications are that sufficient motor torque can be obtained, rotational operation at high speeds is possible without any problems concerning rotor mechanical strength, motor cost is low, and torque ripple is minimized.

SUMMARY OF THE INVENTION

As a means for solving the above problems, there is provided a multi-phase reluctance motor comprising a rotor, the rotor comprising a plurality of magnetically separated split magnetic paths for creating a plurality of magnetic poles on the rotor; connecting portions for mechanically linking said split magnetic paths to one another; and permanent magnets disposed in approximate centers of said split magnetic paths near a borderline area between two magnetic poles in an internal portion of the rotor.

The permanent magnets may be provided in a number that is sufficient for obtaining a motor characteristic desired according to applications. With regards to cost, fewer magnets are advantageous. In a typical example, the permanent magnets are provided in a number identical to the number of the magnetic poles, and arranged in the internal portion of the rotor near the borderline areas between magnetic poles. When necessary to further improve the motor characteristic, permanent magnets may be provided in a number identical to the number of slots surrounded by said split magnetic paths disposed between respective magnetic poles, and arranged in the internal portion of the rotor at the borderline areas between magnetic poles.

As mentioned above, in many cases when the rotor internal and external shapes are formed so as to reduce leaking magnetic flux (for example, when the rotor external shape is structured to form salient poles), torque ripple is increased. This problem of a trade-off relationship can be solved as described below. Each of the slots in the stator is wound with a coil of a corresponding phase such that, when multi-phase sinusoidal current is made to flow in each of the slots through the coils, the vector phase and amplitude expressed by the products of the number of coil turns and the amount of passing current, namely, ampere-turns, become almost identical for each of the slots. As a result, torque ripples having a period larger than or equal to the slot pitch of the stator can be eliminated.

Further, in the rotor including a plurality of magnetic poles, the centers of the magnetic poles may be shifted, from the equally-spaced positions, along the rotor rotational direction by a distance of NN/NR of one slot pitch of the stator. Here, NN is an integer determined for each magnetic pole, and two or more different integers exist as the NN values for all of the rotor magnetic poles. NR is a single integer unique to the rotor indicating the type of the shift of the rotor magnetic poles along the rotor rotational direction.

As a result of the above, torque ripples having a period smaller than or equal to the stator slot pitch can be reduced.

Further, the position of the rotor relative to the stator may be skewed along the rotor rotational direction by an angle of (slot pitch/2) or smaller. Alternatively, the rotor or the stator may be divided into two or more sections in the rotor axial direction, and the sections may be shifted relative to one another along the rotor rotational direction so as to obtain an effect similar to that obtained by the skew.

As a result of the above, torque ripples having a period smaller than or equal to the stator slot pitch can be reduced.

For use in particular applications wherein a strong impact may be applied, a rotor can be effectively strengthened by filling spaces between the split magnetic paths with a non-magnetic material such as resin.

DESCRIPTION OF PREFERRED EMBODIMENT

Figure 1:
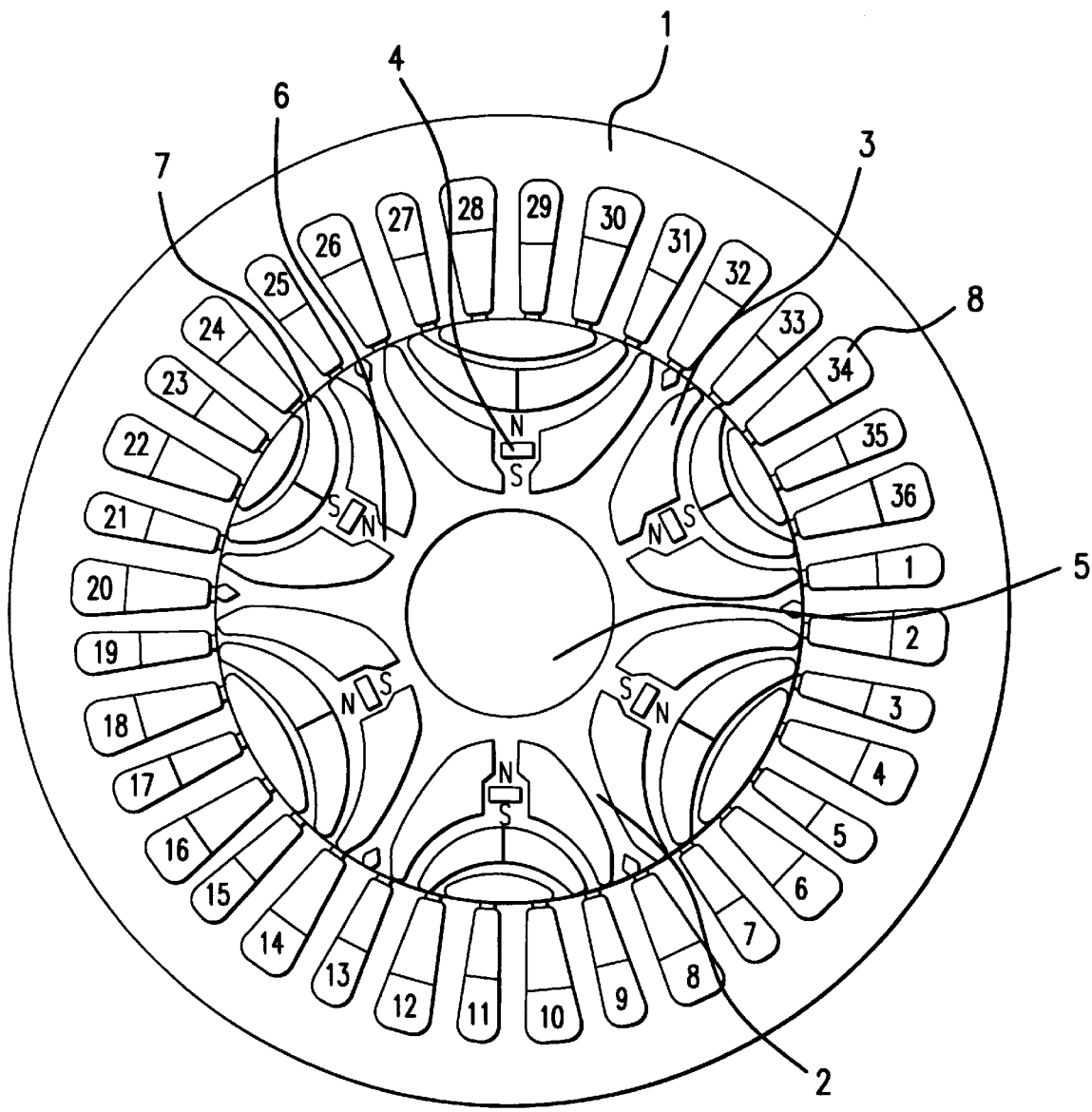
FIG. 1 is a cross-sectional view illustrating an example of a rotor and a stator of a reluctance motor according to the present invention.

Embodiments of the present invention will now be described referring to the accompanying drawings. Descriptions will be omitted for components indicated by the same reference numerals as those that appeared in FIGS. 15 to 20 of the background art, as those components have identical functions and effects.

Figure 2:
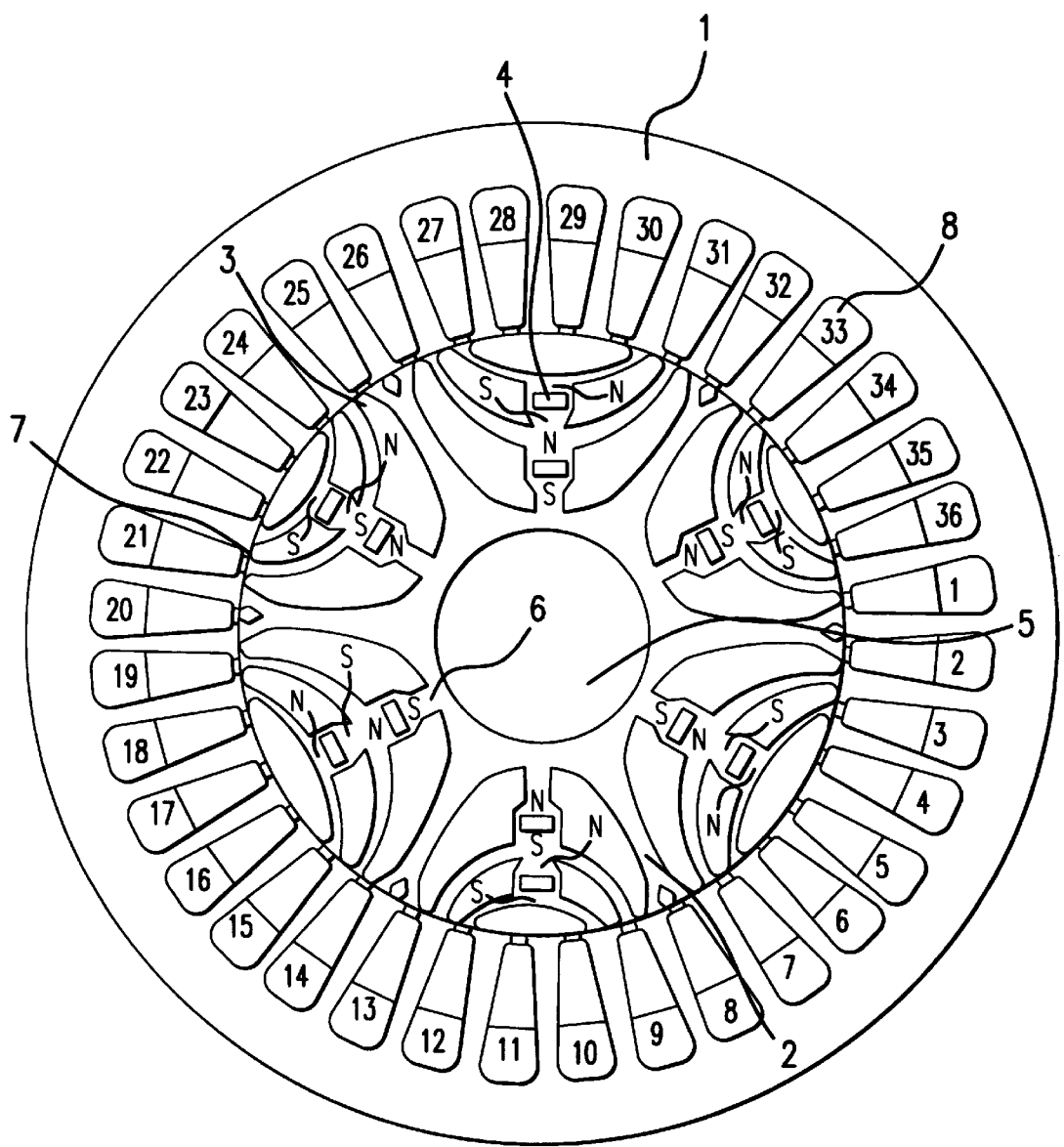
FIG. 2 is a cross-sectional view illustrating another example of a rotor and a stator of a reluctance motor according to the present invention.
Figure 3:
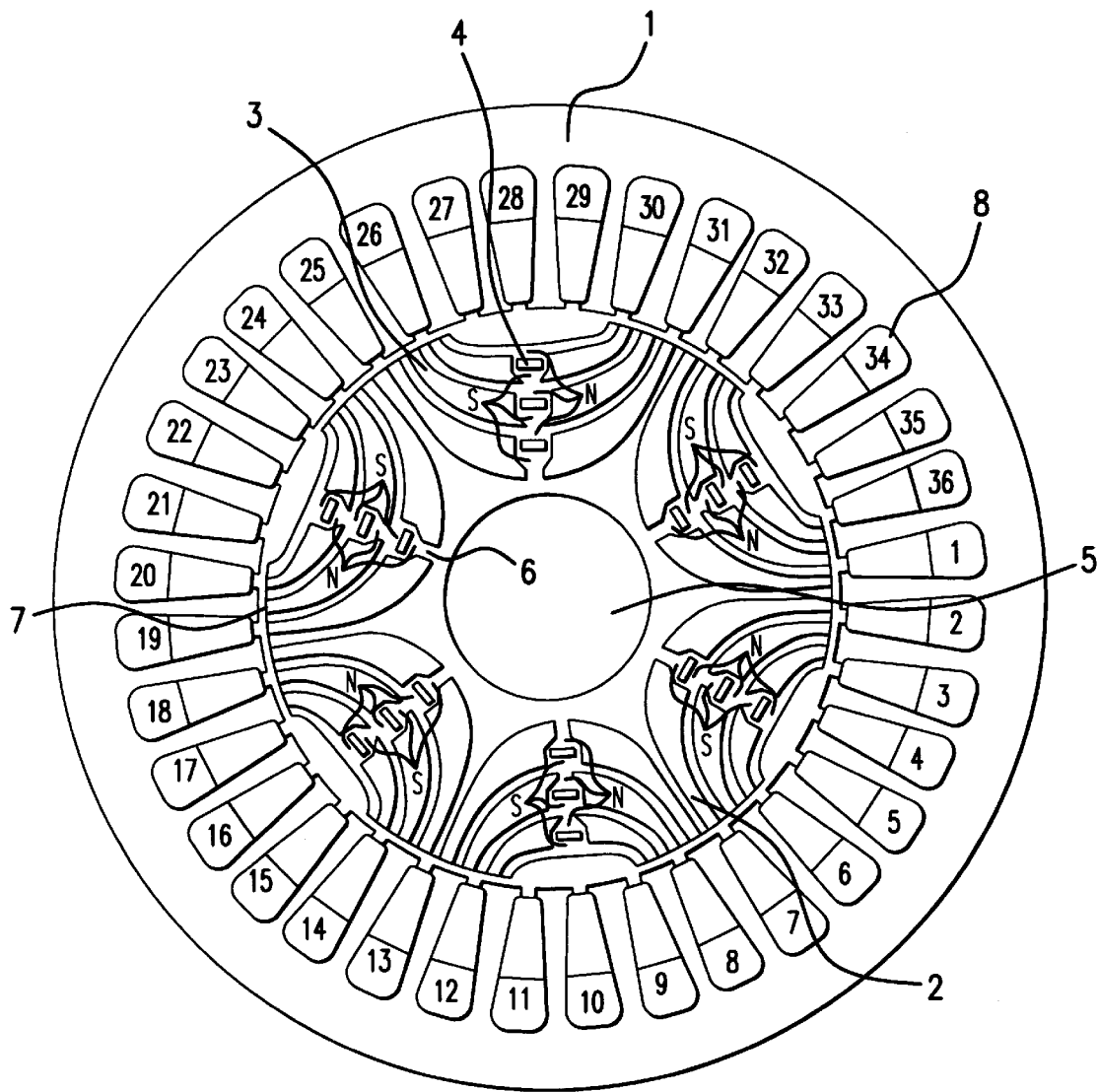
FIG. 3 is a cross-sectional view illustrating a further example of a rotor and a stator of a reluctance motor according to the present invention.
Figure 4:
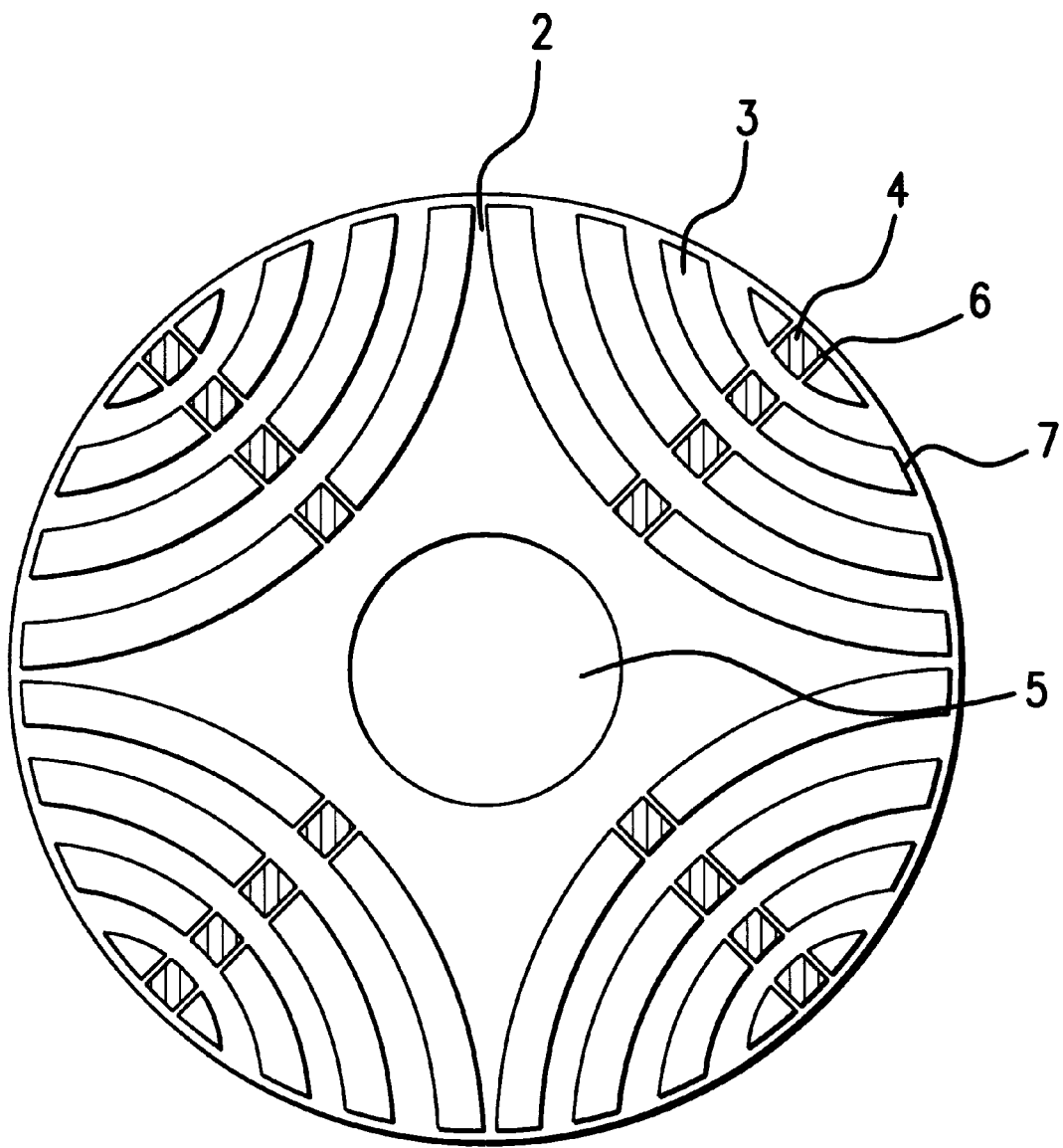
FIG. 4 is a cross-sectional view illustrating another example rotor of a reluctance motor according to the present invention.

FIG. 1 is a diagram illustrating a cross-sectional structure of a rotor 2 and the surrounding stator 1 in a reluctance motor. In FIG. 1, among the connecting portions 6 present in the rotor 2, only the connecting portions 6 closest to the motor shaft 5 are provided with permanent magnets 4. The rotor 2 has a salient pole structure, and the slits 3 are made as wide as possible. These measures are taken to reduce leaking magnetic flux. Further, the connecting portions 6 having permanent magnets 4 are formed to have the least width necessary to withstand the centrifugal force. This is also one of the measures to minimize leaking magnetic flux. While permanent magnets are disposed on only one of the connecting portions between adjacent magnetic poles in FIG. 1, FIG. 2 shows the embodiment wherein permanent magnets 4 are arranged on every connecting portion. FIG. 3 illustrates the case where three slits 3 are formed between adjacent poles. FIG. 4 is a schematic diagram for explaining the mechanism for reducing magnetic flux leaks in the embodiments of FIGS. 1 to 3. Accordingly, only the rotor 2 is indicated in FIG. 4. Moreover, to simplify the explanation, the number of magnetic poles is four, and the rotor structure is not salient pole type but arc-shaped, differing from the embodiments of FIGS. 1 to 3. The widths of the slits 3 are also different from the above embodiments.

Figure 5:
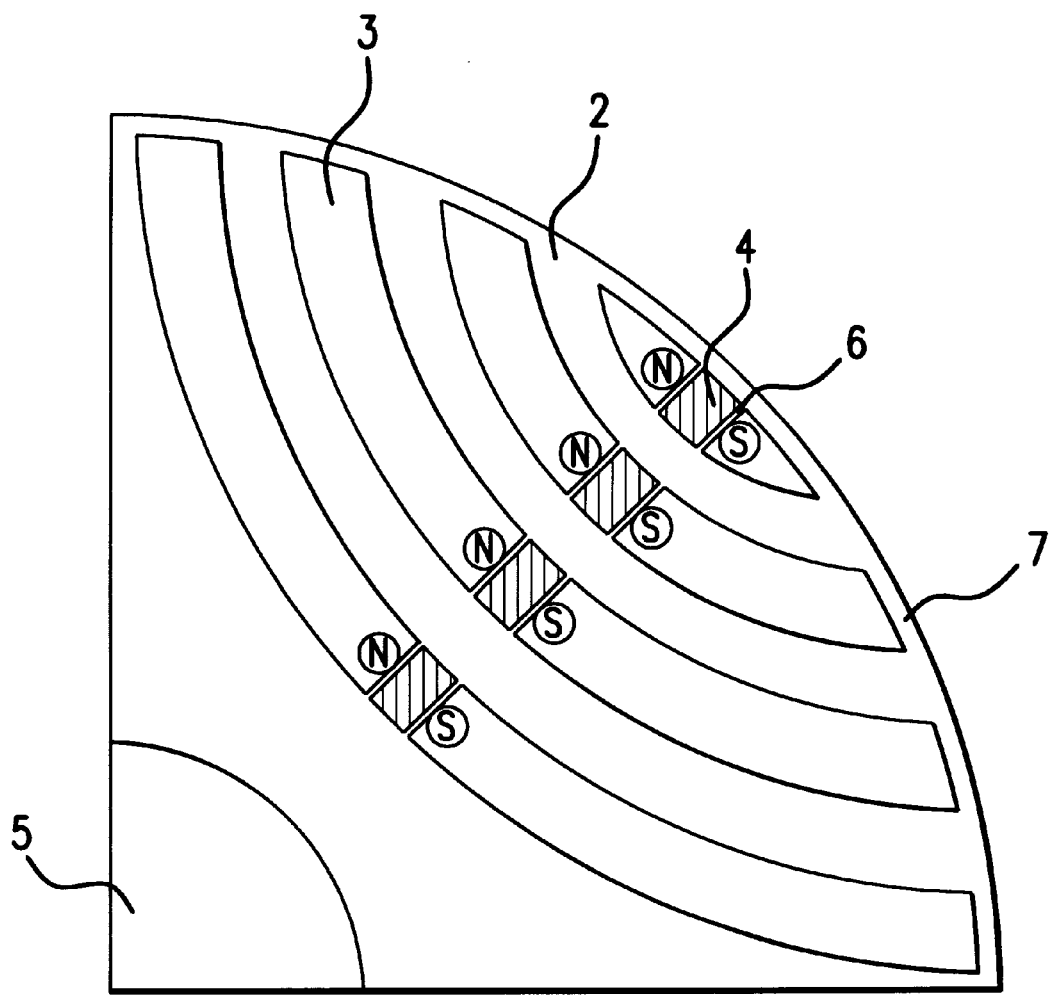
FIG. 5 is an enlarged view showing a 90° portion of the rotor of FIG. 4.
Figure 6:
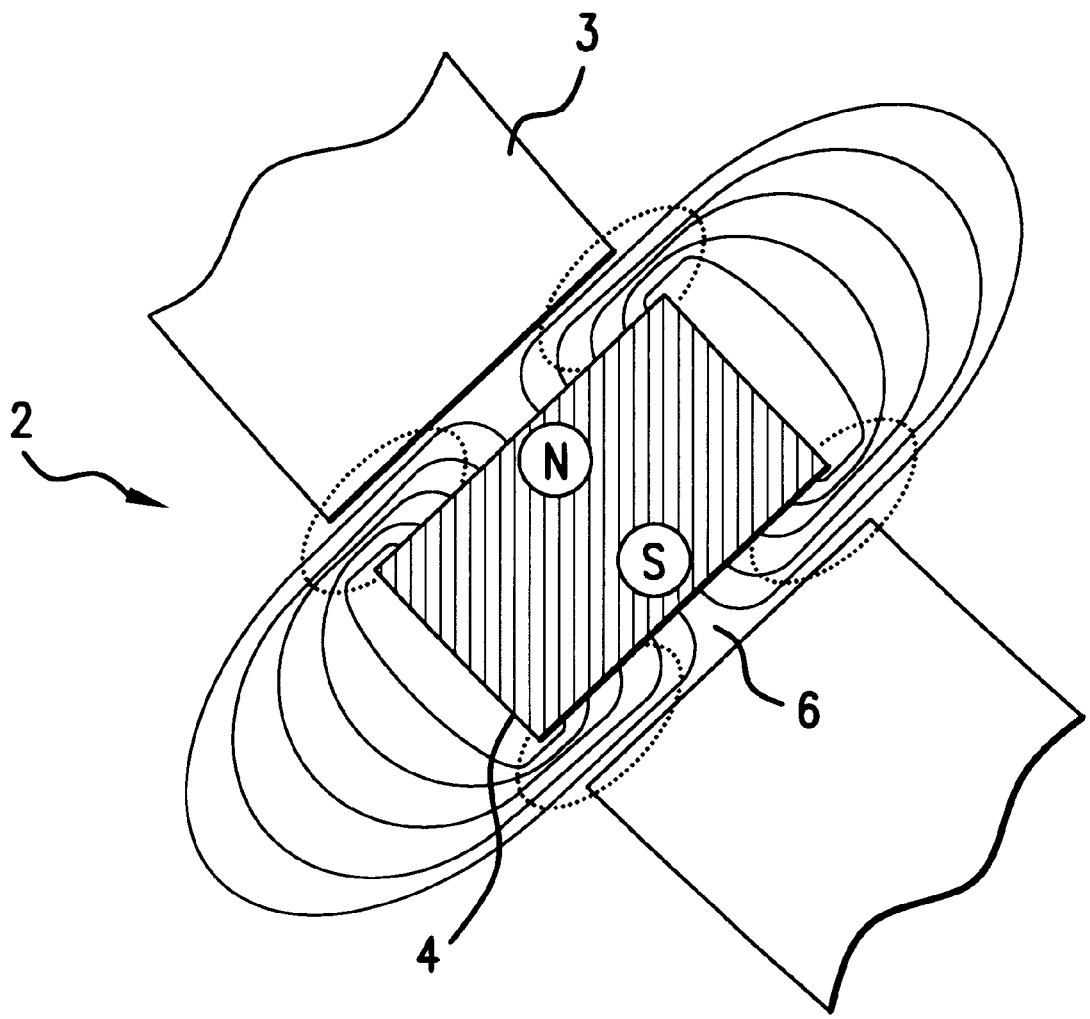
FIG. 6 is an enlarged view of FIG. 5 showing a portion carrying a permanent magnet.

The mechanism for reducing leaking magnetic flux in FIG. 4 is described using FIGS. 5 and 6. FIG. 5 is an enlarged view of a 90° portion of the rotor 2 of FIG. 4, and FIG. 6 is a further enlarged view of FIG. 5 showing a portion carrying a permanent magnet 4. N and S in FIG. 5 indicate the N and S poles of permanent magnets 4, respectively. In this embodiment, the magnetic poles are oriented in the directions along the split magnetic paths. In such a case, magnetic flux distribution as shown in FIG. 6, for example, is generated surrounding a permanent magnet 4. It should be noted that the magnetic flux shown in FIG. 6 is only a schematic example, and that the lines are not drawn to proportionally indicate the actual magnetic flux density. As known, magnetic flux density is proportional to magnetomotive force but does not increase above a fixed amount. This is the phenomenon of magnetic flux saturation. As can be seen in FIG. 6, the width of the connecting portion 6 on both sides of the permanent magnet 4 is extremely narrow compared to the width of the split magnetic paths, and magnetic flux saturation has occurred in the connecting portion 6. In general, magnetic flux saturation in the connecting portion 6 permits no additional magnetic flux to pass through the connecting portion 6, resulting in reduction of magnetic flux leaks in the connecting portion. Further, even if the connecting portion 6 is not magnetically saturated by the permanent magnet 4, as long as magnetic flux is supplied in the connecting portion 6 at a certain level, magnetic flux leaks can be effectively reduced in the advantage of motor operation.

Figure 7:
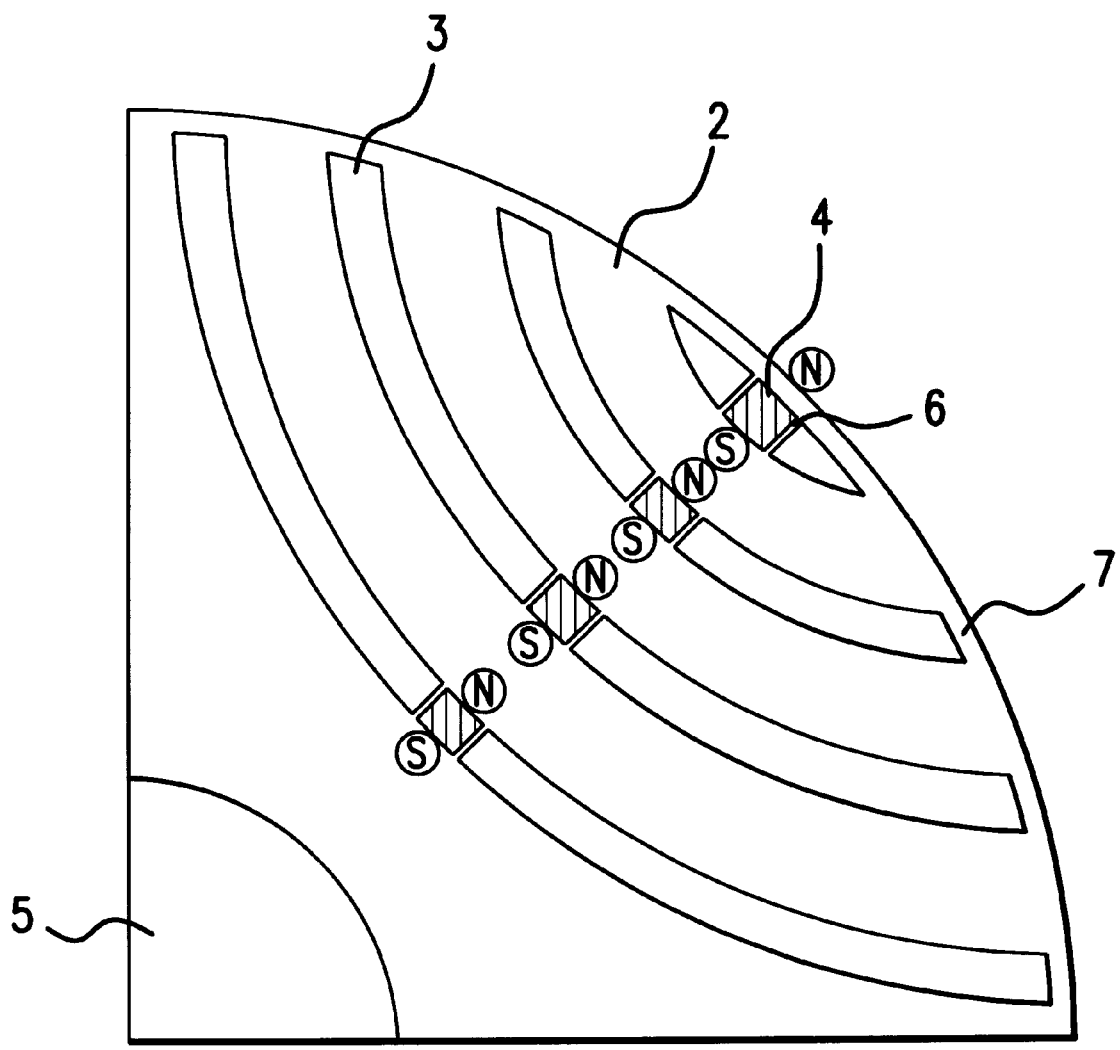
FIG. 7 is a diagram showing the view of FIG. 5 with the orientation of the permanent magnets changed by 90°.
Figure 8:
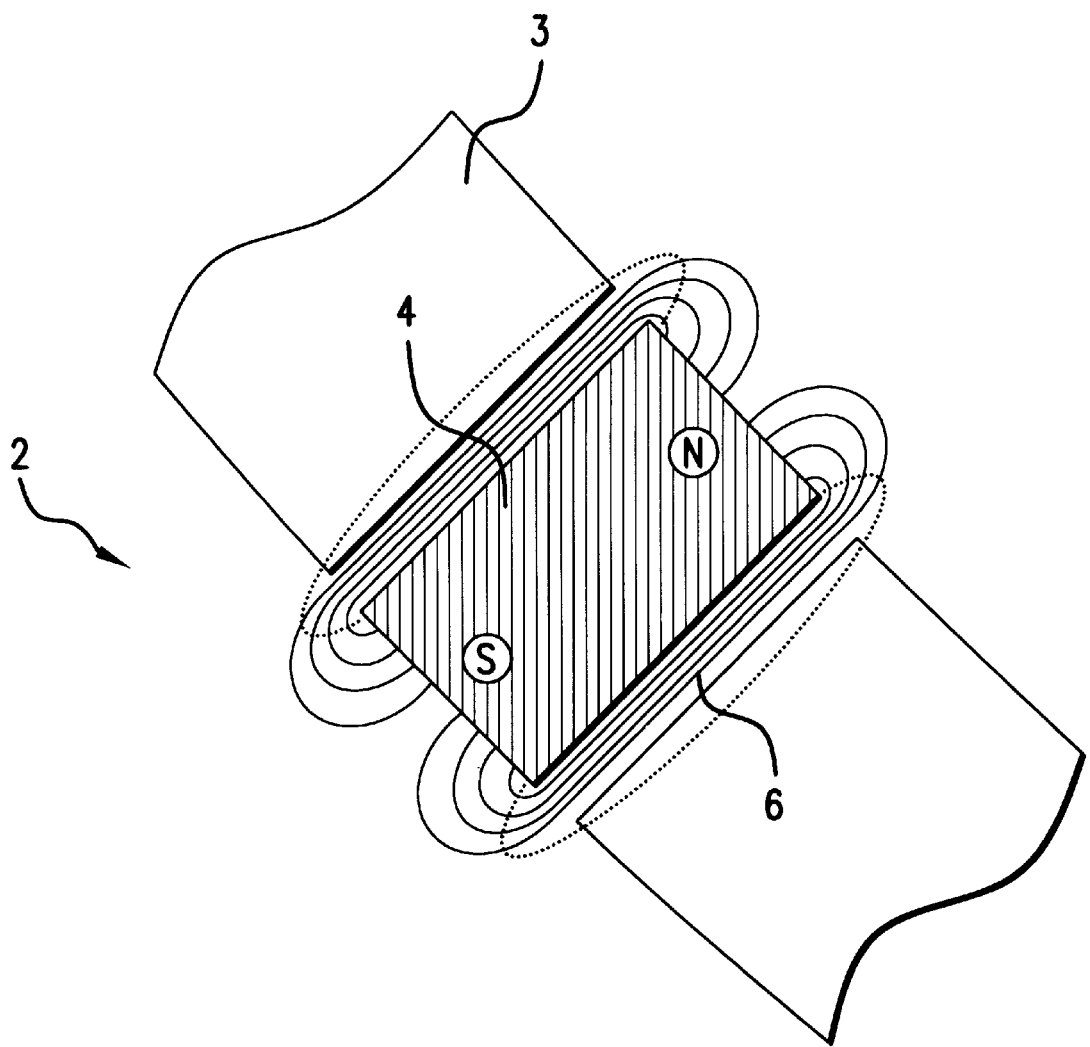
FIG. 8 is an enlarged view of FIG. 7 showing a portion carrying a permanent magnet.

FIGS. 7 and 8 illustrate the embodiment shown in FIGS. 5 and 6 with the orientation of the permanent magnets shifted by 90° In FIGS. 7 and 8, magnetic flux leakage is reduced by magnetic flux saturation according to a concept similar to that described above. Magnetic flux actually generated by the permanent magnets 4 may not be limited within the connecting portions 6 as shown in FIG. 6, but can also exist in the split magnetic paths and further in the periphery portion 7 of the rotor 2. Magnetic flux generated by the permanent magnets 4 can be supplied sufficiently to the periphery portion 7, and the magnetic flux passing from the stator through the periphery portion 7 can thereby be reduced. Accordingly, reduction of leaking magnetic flux components that negatively affect the motor operation may be accomplished.

Current in a reluctance motor can be understood to be comprising a d-axis current generating magnetic flux at each magnetic pole and a q-axis current generating torque. According to this understanding, the leaking magnetic flux components are generated by the magnetomotive components of the q-axis current. In a state wherein a fixed amount of d-axis current and q-axis current is supplied to a reluctance motor, the orientation of N and S poles of generated magnetic flux is in opposite directions at adjacent magnetic poles. A permanent magnet 4 is particularly effective if its N and S poles are oriented in opposite directions to those of the corresponding leaking magnetic flux. Accordingly, as shown in FIGS. 1 to 3, the orientation of N and S poles of the permanent magnets 4 at one magnetic pole of the rotor is arranged in the opposite direction to that of the permanent magnets 4 at the adjacent magnetic poles. In this state, the permanent magnets 4 supply magnetic flux to the connecting portions 6 and the soft magnetic material portions of the periphery portion 7, thereby reducing leaking magnetic flux. Further, when the permanent magnets 4 generate a large amount of magnetic flux, magnetic flux is not only supplied to the connecting portions 6 and the periphery portion 7 to reduce leaking magnetic flux at those portions, but may also work to cancel leaking magnetic flux components generated at other portions, resulting in additional reduction of leaking magnetic flux over the entire motor.

Although disposing permanent magnets 4 on the connection portions 6 can be effective in reducing magnetic flux leaks as described above, the following points should be noted.

Even when permanent magnets are not employed, the amount of magnetic flux that leaks from the connecting portions 6 is slight compared to the magnetic flux formed in the split magnetic paths. The present invention is intended to reduce this leaking magnetic flux in a slight amount. Although the leak is in a slight amount, its influence on the generated torque is significant. Especially when a reluctance motor is operated at a rotational speed higher than the base rotational speed, the motor control device executes so-called field weakening control. While the field weakening control is effected, the magnetic flux at each magnetic pole is decreased to a small amount. Accordingly, the influence of the above slight amount of leaking magnetic flux relatively increases, presenting a greater problem to the motor characteristic. Reduction of leaking magnetic flux is therefore effective in reducing reactive voltage, especially when operating a reluctance motor at a high speed, and also particularly advantageous in that the capacitance of a drive device can be lowered.

When a connecting portion 6 is formed wider than in a conventional structure to strengthen the rotor 2, a permanent magnet 4 must supply additional magnetic flux to the connecting portion 6 in an amount that at least compensates for the increased width. If this is not done, magnetic flux leak would inevitably increase. Accordingly, the type and shape of the permanent magnet 4 and the width of the connecting portion 6 must be determined so as to avoid any increase in magnetic flux leakage.

Although arranging permanent magnets 4 in the rotor 2 can reduce magnetic flux leaks and prevent decrease in generated torque as explained above, imbedding of permanent magnets 4 in the rotor 2 may, on the other hand, contribute to unfavorable increase in torque ripples due to the permanent magnets 4. Especially in reluctance motors, rotor shape and torque ripples closely relate to one another. For example, when the rotor periphery and internal structures are relatively uniform and the rotor outer shape is circular as in reluctance motors shown in FIGS. 15 or 18, a magnetic flux distribution having only a small amount of harmonics is likely to be generated at each magnetic pole of the rotor 2. It can be qualitatively concluded that torque ripples are relatively reduced in such structures.

On the other hand, when sharply uneven portions are formed on the rotor periphery, or when permanent magnets are integrated, in an attempt to reduce leaking magnetic flux in the d-axis direction, the problem of increase in torque ripple arises.

Nevertheless, a practical reluctance motor must provide both a large torque and minimal torque ripple. However, these two requirements conventionally contradict one another and are in a trade-off relationship. To obtain a practical reluctance motor, a method for reducing torque ripples must be provided that can be executed simultaneously with a method for increasing torque. Such methods for reducing torque ripples defined in claims 3, 4, and 5 will be described referring to FIGS. 9 through 12.

Figure 9:
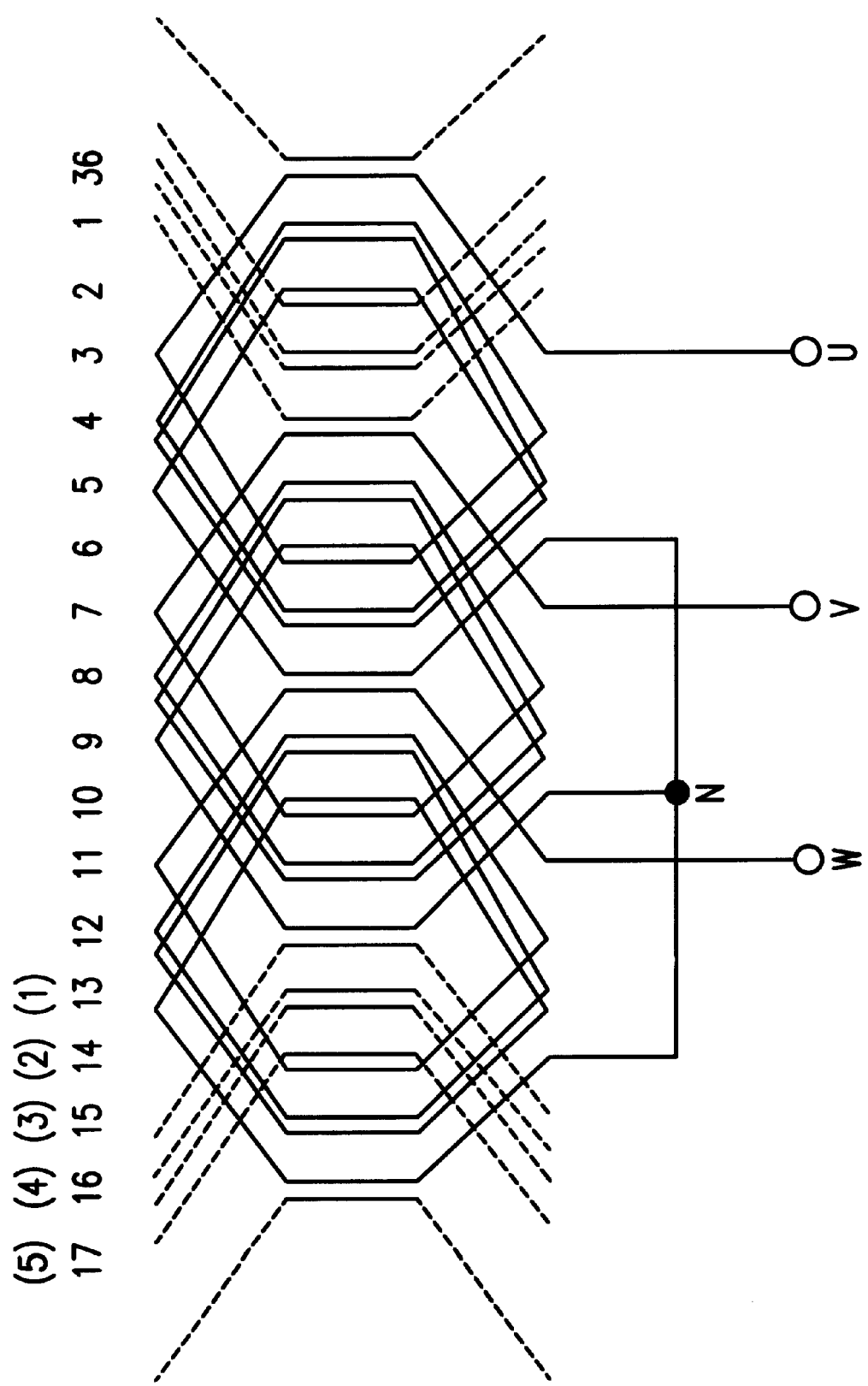
FIG. 9 is an example schematic illustration for explaining how coils are wound in the present invention.
Figure 10:
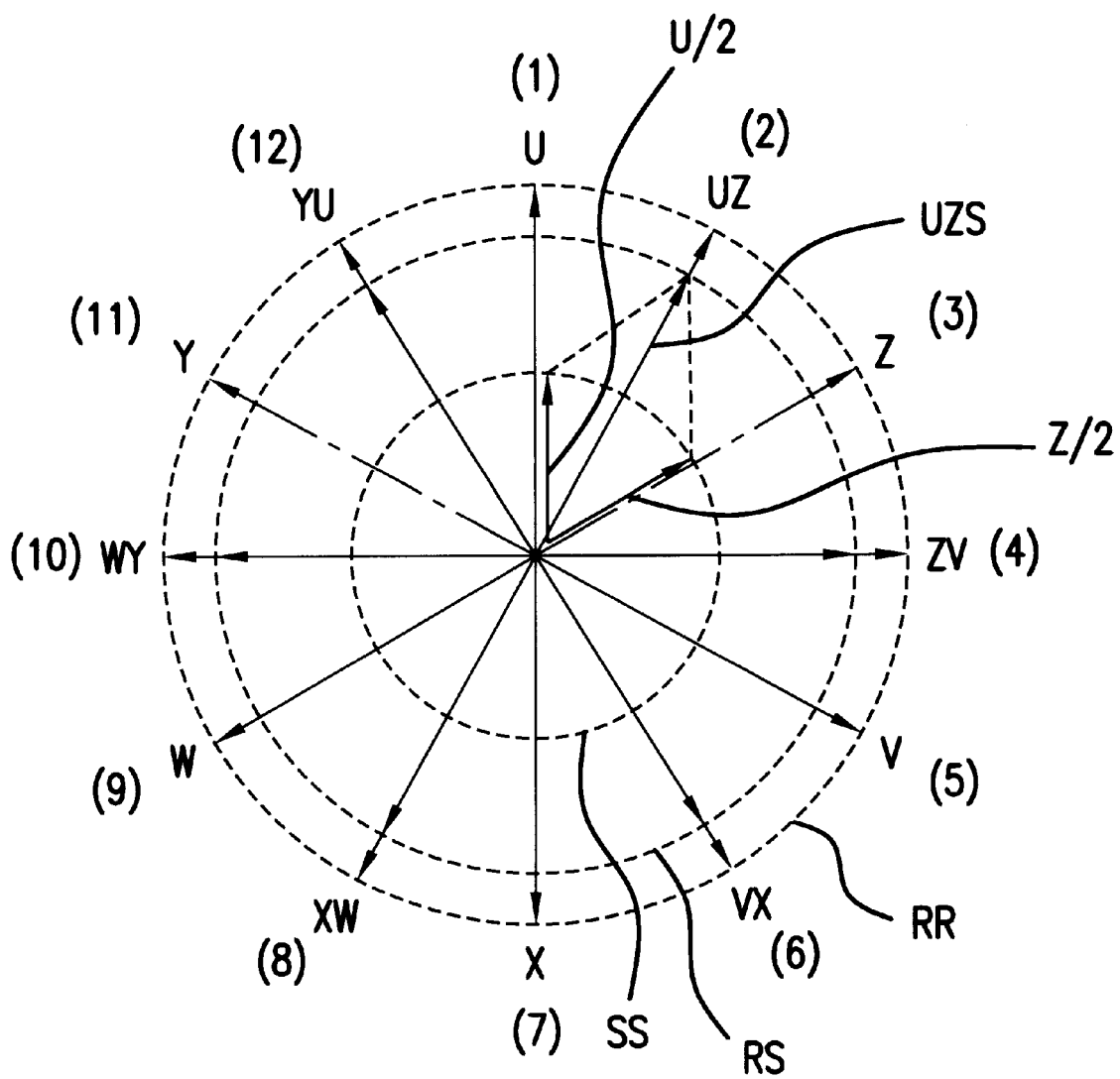
FIG. 10 is an example schematic illustration showing vectors of phases and amplitudes of a passing current in the present invention.

The features of claim 3 is described using FIGS. 9 and 10. The coil diagram of FIG. 9 illustrates the type of winding called the fractional pitch winding implemented in a three-phase, six-pole, and 36-slot reluctance motor. The diagram covers the range of two poles. This type of winding was devised so that, when a three-phase current is applied to the motor, the distribution of current in the slots 8 becomes as sinusoidal as possible in the direction of rotor rotation, allowing smooth change of the rotating directions. Specifically, coil wires in the upper and the lower sections of each slot carry currents of different phases. A half of the coil wires of the respective sections of each slot is extended toward the counterclockwise direction (CCW) by one slot pitch. The solid and dotted lines in FIG. 10 show the vectors of the current for each slot 8 when a three-phase sinusoidal current is made to flow in these coil wires in each slot 8 by executing a sinusoidal current control on the current. For example, amplitude RS of the current vector in the coil of slot number 2 is the vector sum UZS of U/2 and Z/2. RS is at COS 30°=0.866 relative to amplitude RR. Amplitude SS is ½ of amplitude RR. When a three-phase sinusoidal current is made to flow in a motor, the current passing in the slots should ideally be sinusoidally distributed on the stator periphery. However, in reality, the distribution of the current in the slots is not sinusoidal on the stator periphery. The torque generated by the motor is uneven even when the motor is driven by a three-phase sinusoidal current, and therefore torque ripples are produced.

However, in the present example embodiment, the current vector of slot number 2 is changed from UZS having amplitude RS to UZ having amplitude RR. Specifically, the number of turns of each of the U-phase coil wire and the V-phase coil wire wound in slot number 2 is increased to (0.5/COS 30°)=0.57735 times the number of turns wound in slot number 1. As a result, the current vector amplitude in slot number 2 becomes RR. By performing the same procedure for slot numbers 4, 6, 8, 10, and 12, the motor can be driven at 12-phase current vectors that are uniformly distributed with respect to the phases and have equal amplitudes. Except for the fact that the slots 8 are disposed in a discrete arrangement over the stator 1 circumference, this state is ideal for motor operation. Torque ripple components that have a period larger than the slot pitch do not exist in this state.

Figure 11:
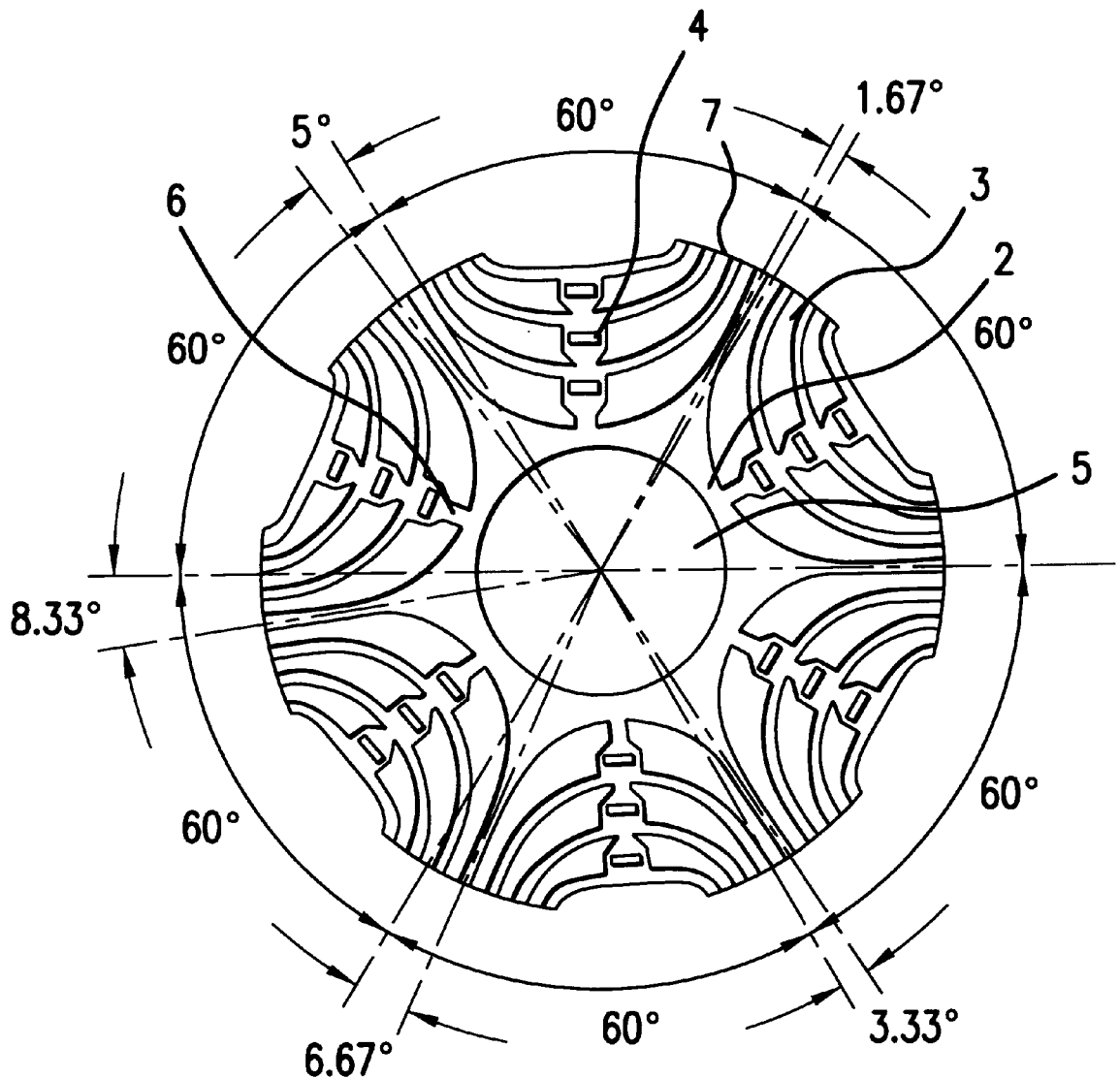
FIG. 11 is a cross-sectional view illustrating another example rotor of a reluctance motor according to the present invention.

The scheme for reducing torque ripple defined in claim 4 will now be described referring to FIG. 11. FIG. 11 is a cross-sectional view of a rotor 2, and rotor centerlines at every 60° are indicated by dotted lines. The centers of the magnetic poles of the rotor are at angles of 0°, 1.67°, 3.33°, 5°, 6.67°, and 8.33°, respectively, relative to the centerlines. Each of the magnetic pole centers are shifted along the rotor rotational direction by (one stator slot pitch/6 poles)=1.67°. A variety of different arrangements of the shift angles are possible. According to such a structure, the electromagnetic effect between each of the rotor 2 magnetic poles and the stator 1 is shifted along the rotor rotational direction by the above shift angles. In this way, torque ripples having a period smaller than or equal to one stator slot pitch can be cancelled, thereby reducing total torque ripples.

It can be easily understood geometrically that torque ripples having a one-slot period and a ⅓-slot period are cancelled in this embodiment. The torque ripple components having a period larger than the slot pitch can be eliminated by the above-described improved coil winding. The remaining harmonic torque ripple components having a period smaller than or equal to ⅓ of the slot pitch can be eliminated by skewing the rotor 2 relative to stator 1 by an angle equal to the period of lowest harmonic torque ripple component among the remaining harmonic torque ripple components, as described below.

Figure 12:
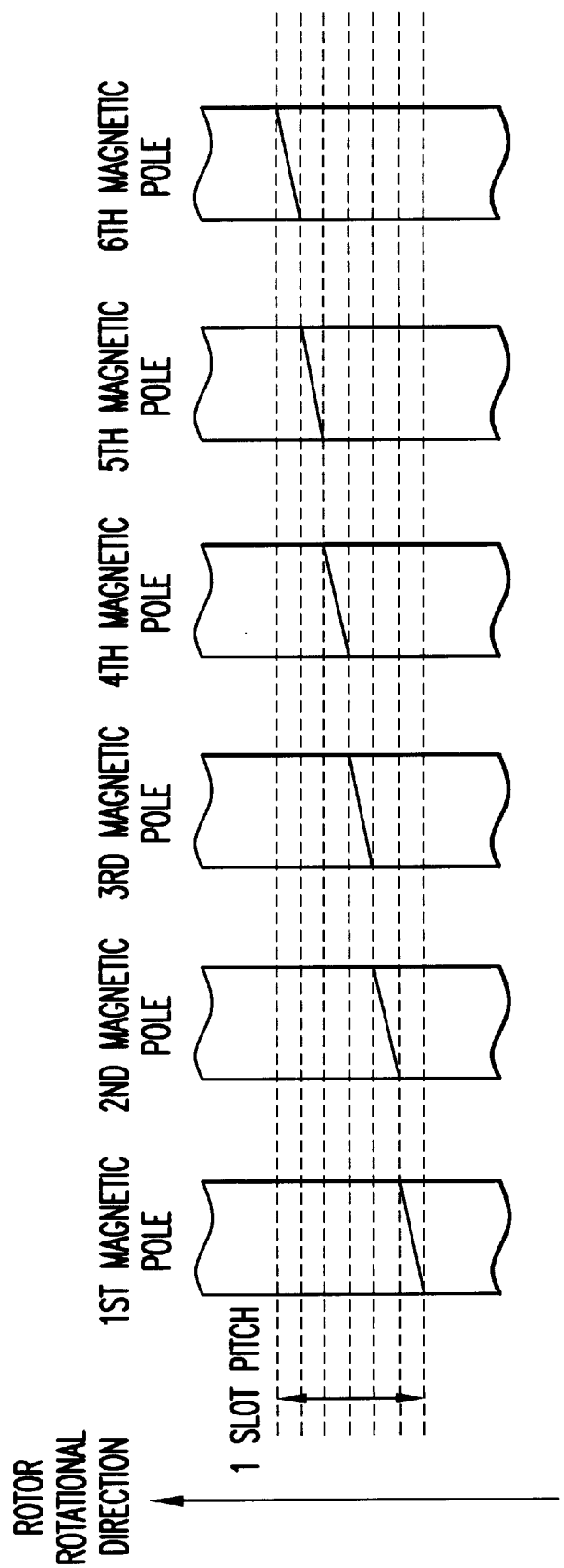
FIG. 12 is a schematic illustration for explaining effects of a skew according to the present invention.

The scheme for reducing torque ripples defined in claim 5 will now be described referring to FIG. 12. The above-described procedure of shifting the rotor magnetic pole position is, by itself, effective in reducing torque ripples. In addition, to eliminate harmonic torque ripples, a skew can be implemented at an angle smaller than or equal to (stator slot period/2). Implementing a skew in combination with the shifting is effective in alleviating the existing disadvantages associated with skewing because, with the shifting in effect, the skew can be executed at such a small angle. Specifically, experiments have confirmed that, in some reluctance motors, skewing resulted in the presence of rotor magnetic flux along the rotor axial direction, and torque ripples having a period smaller than or equal to the skew angle could not be sufficiently eliminated although somewhat reduced. By using the above-described shifting technique to eliminate the torque ripple components having a period close to the slot pitch and additionally using the skewing technique to eliminate only the harmonic torque ripple components, this disadvantage associated with skewing is eliminated. Further, the electromagnetic steel plates of a motor usually have a thickness of 0.5 mm and an insulating film disposed thereon, and generation of eddy current loss occurring on changes of magnetic flux in the radial direction and the rotor rotational direction is thereby prevented. However, a motor structure is inherently such that, when there are changes of magnetic flux in the rotor axial direction (which may be caused by skewing), increase in eddy current loss cannot be avoided. In that respect, skewing should be implemented at a smallest possible angle, and the present invention is desirable in that the skew angle is made very small.

The effect of skewing implemented in the rotor 2 of the reluctance motor shown in FIG. 11 will be explained next. Indicated in FIG. 12 are the magnetic pole centerlines in shifted positions at 0°, 1.67°, 3.33°, 5°, 6.67°, and 8.33°, respectively, on the circumference of the rotor in FIG. 9, partially taken out and aligned on a horizontal axis. The respective centerlines are skewed by ⅙ of the slot pitch. As each magnetic pole is (in addition to being shifted by ⅙ slot pitch) skewed by ⅙ slot pitch, when summed up, skew by one slot pitch is geometrically effected for the entire circumference as apparent from FIG. 12. By this arrangement, torque ripple components having a period smaller than one slot pitch can be almost completely eliminated. The unfavorable generation of magnetic flux in the rotor axial direction due to a large skew angle can be avoided because the actually implemented skew is only in the range of ⅙ slot pitch. Successful elimination of torque ripples is thus accomplished.

Figure 13:
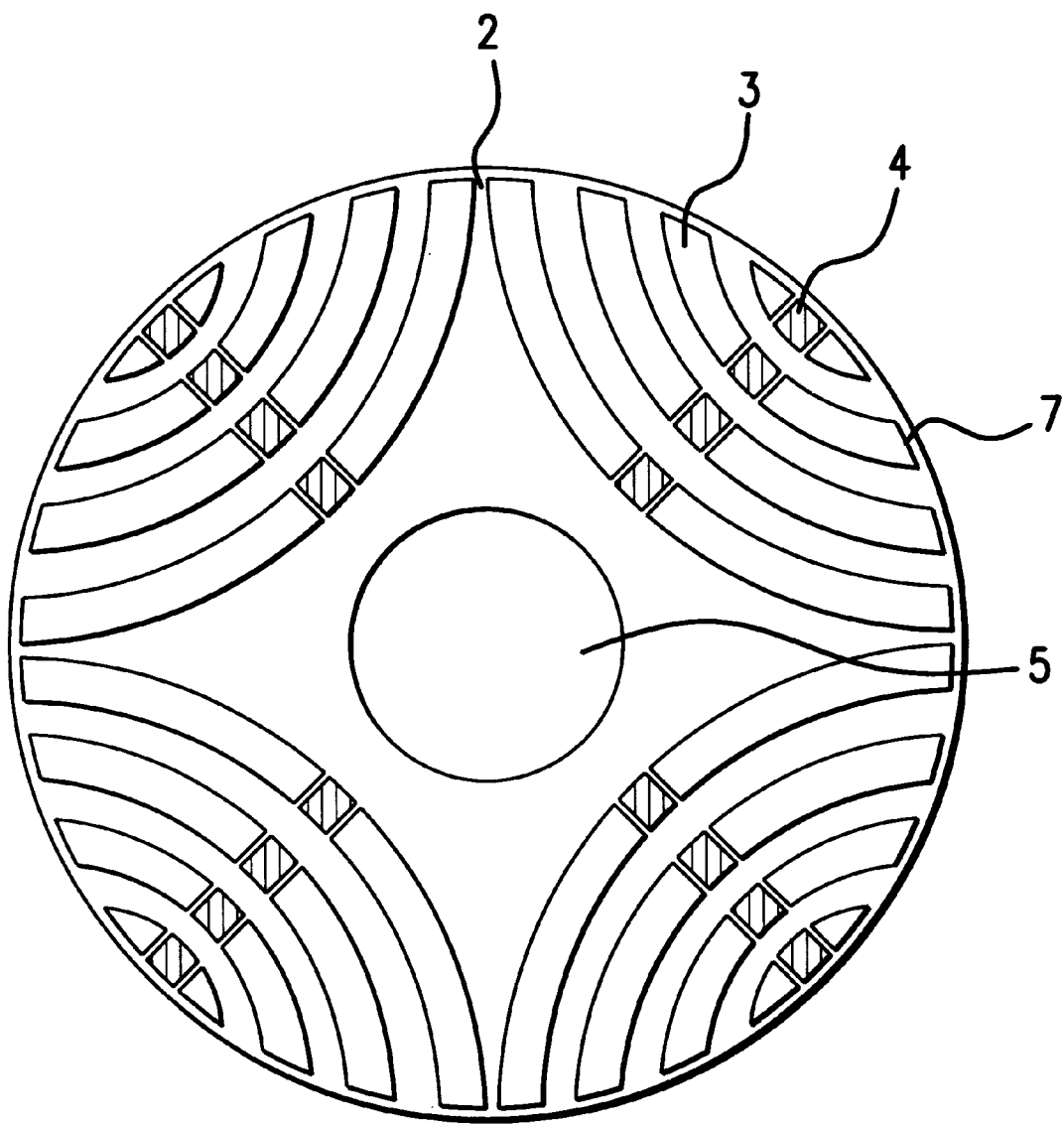
FIG. 13 is a cross-sectional view illustrating a further example rotor of a reluctance motor according to the present invention.
Figure 14:
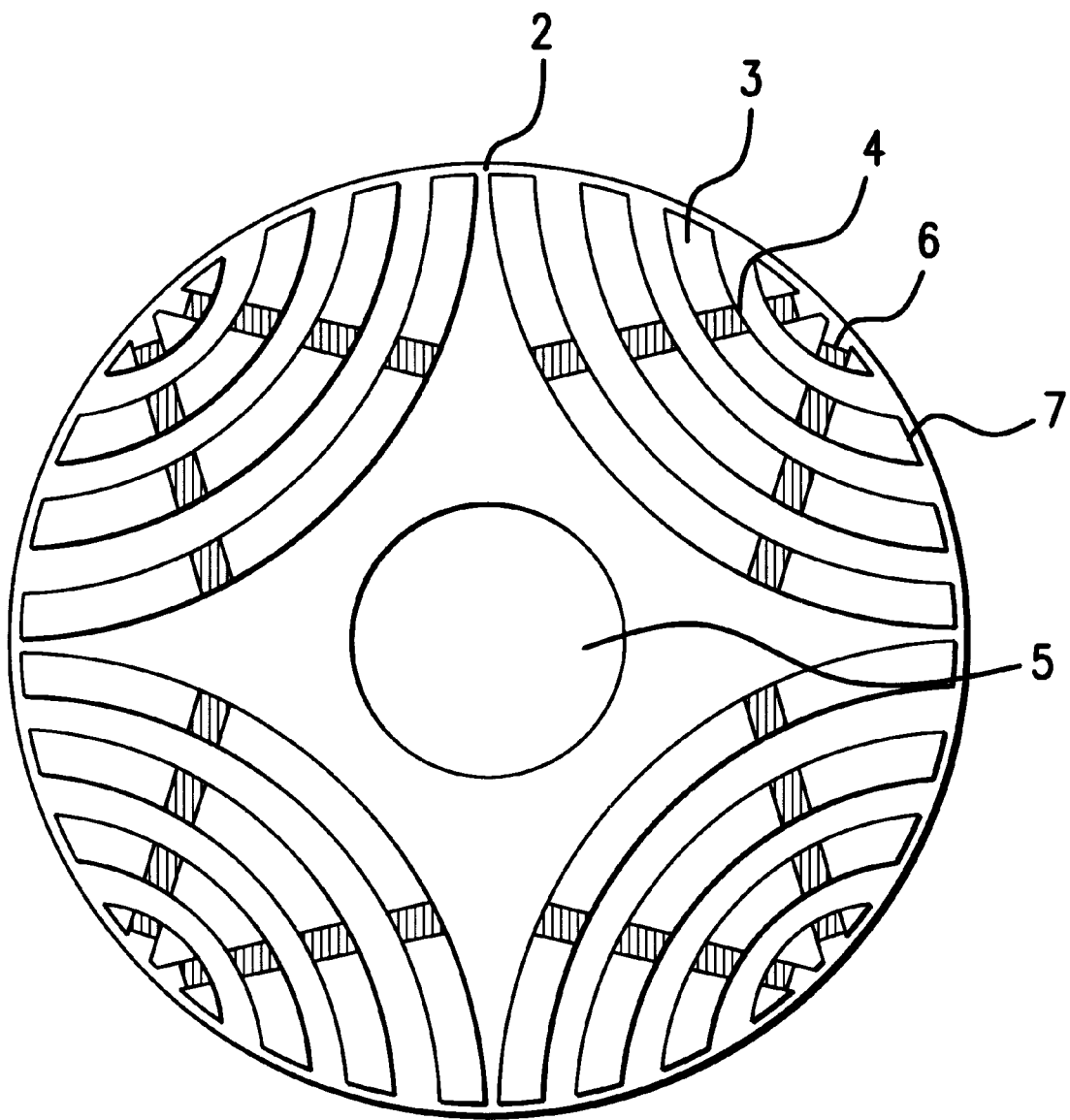
FIG. 14 is a cross-sectional view illustrating another example rotor of a reluctance motor according to the present invention.
Figure 15:
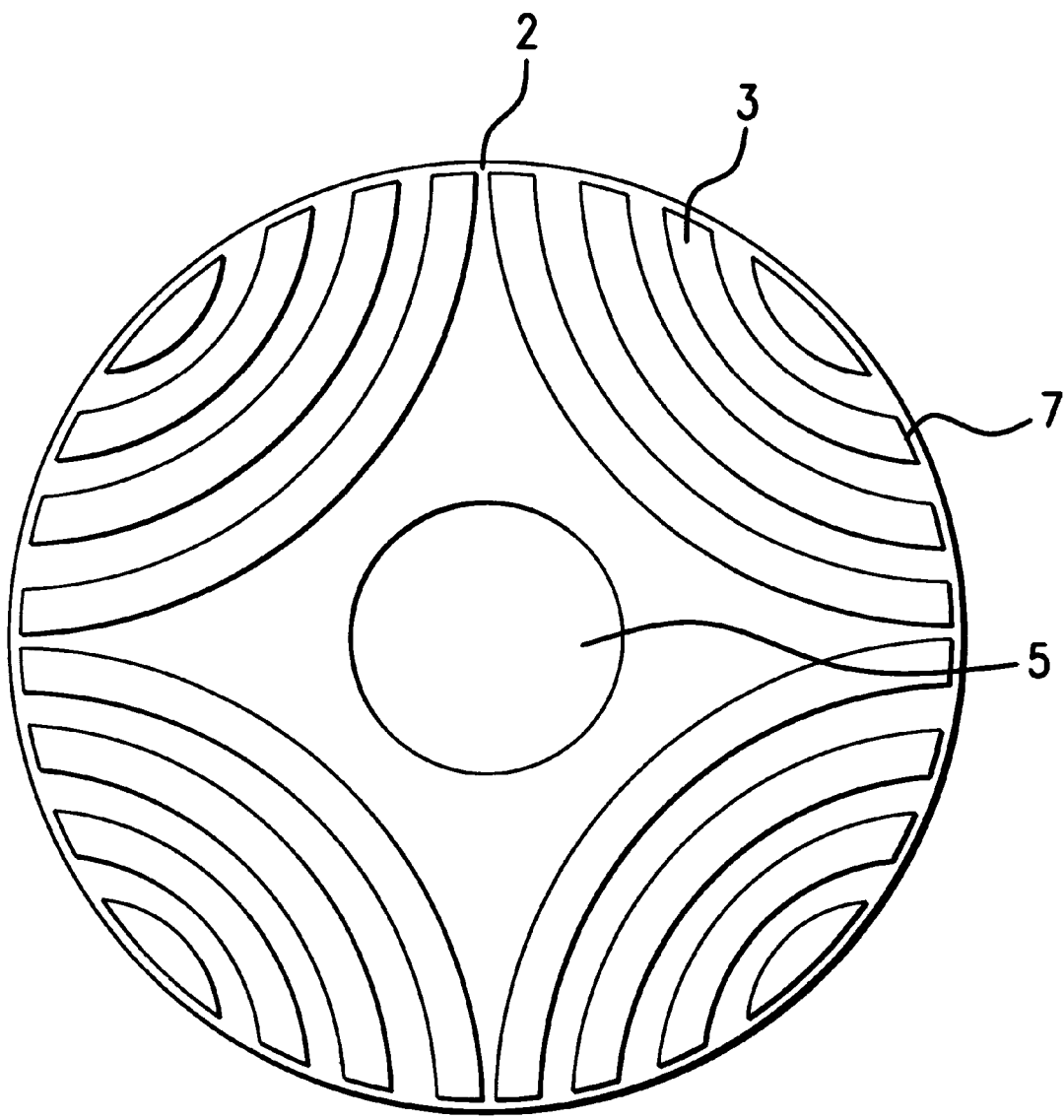
FIG. 15 is a cross-sectional view illustrating an example rotor of a conventional reluctance motor.
Figure 16:
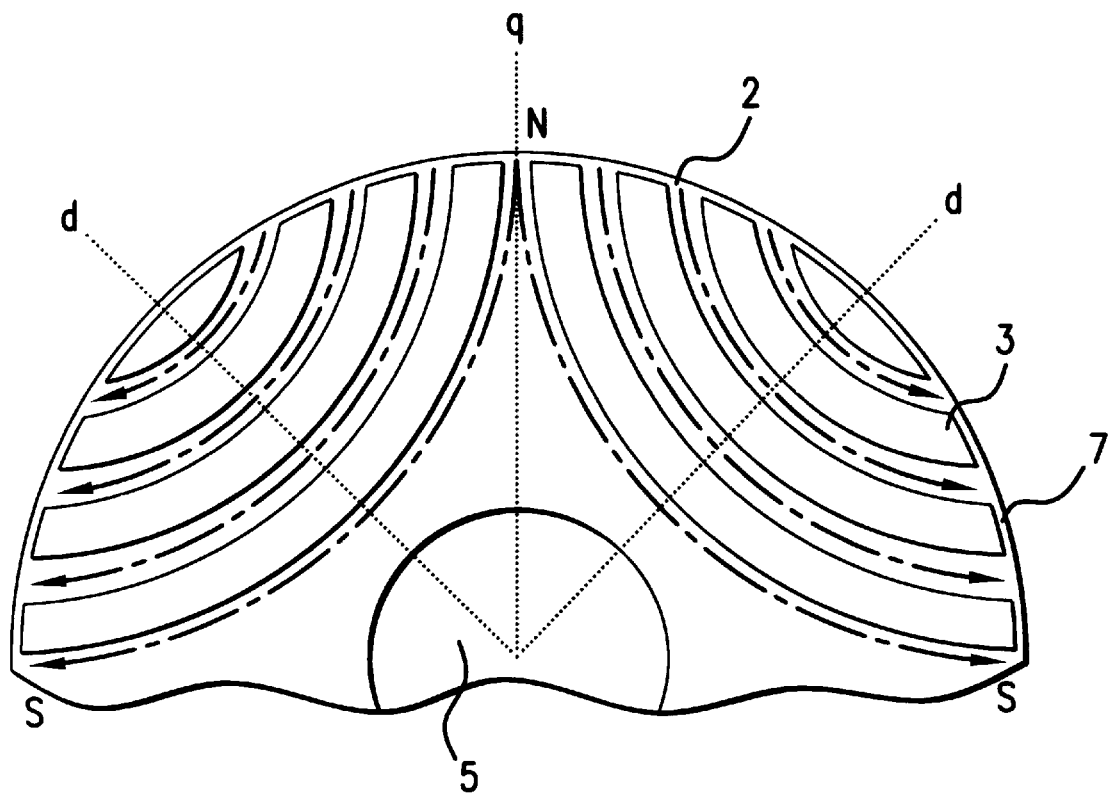
FIG. 16 is an enlarged view showing a 180° portion of the rotor of FIG. 15.
Figure 17:
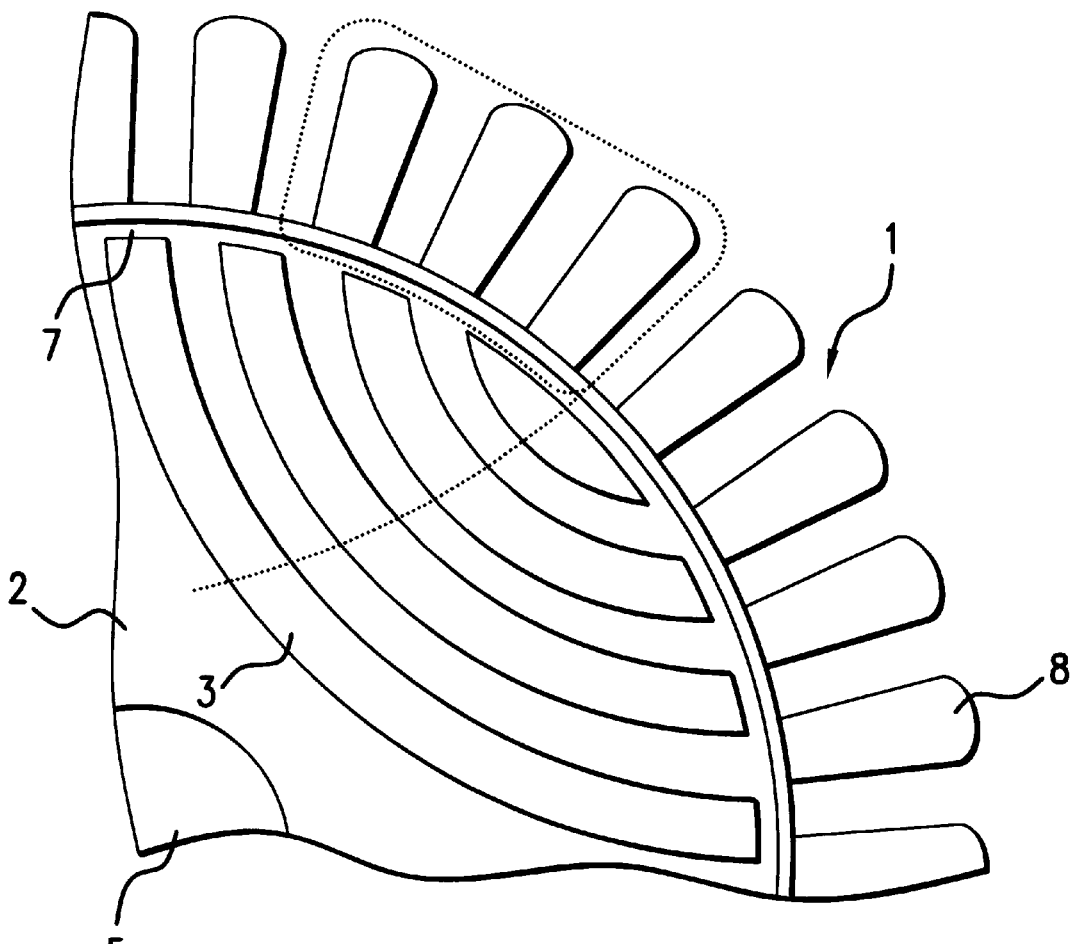
FIG. 17 is an enlarged view showing a 90° portion of the rotor of FIG. 15.
Figure 18:
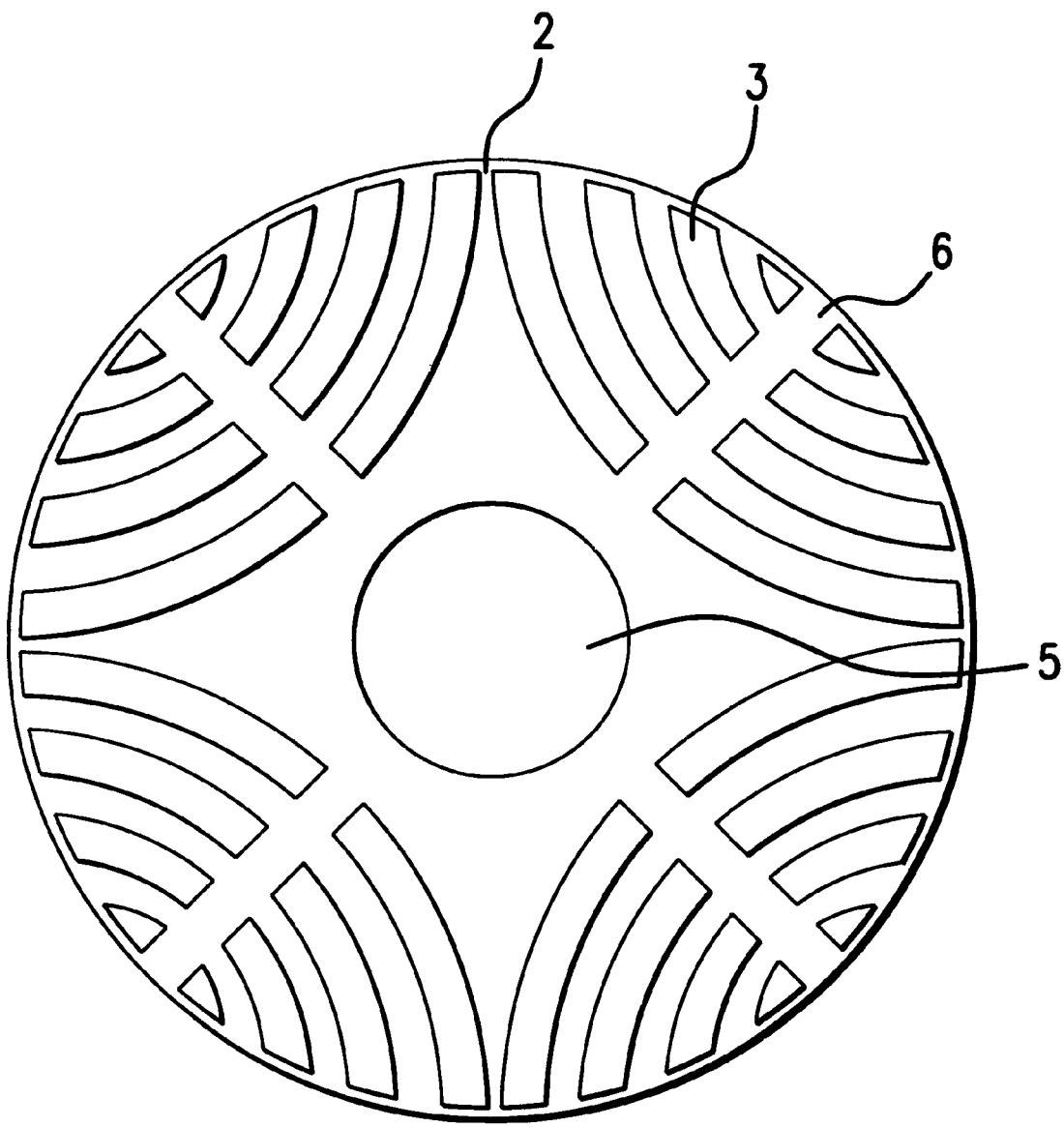
FIG. 18 is a cross-sectional view illustrating another example rotor of a conventional reluctance motor.
Figure 19:
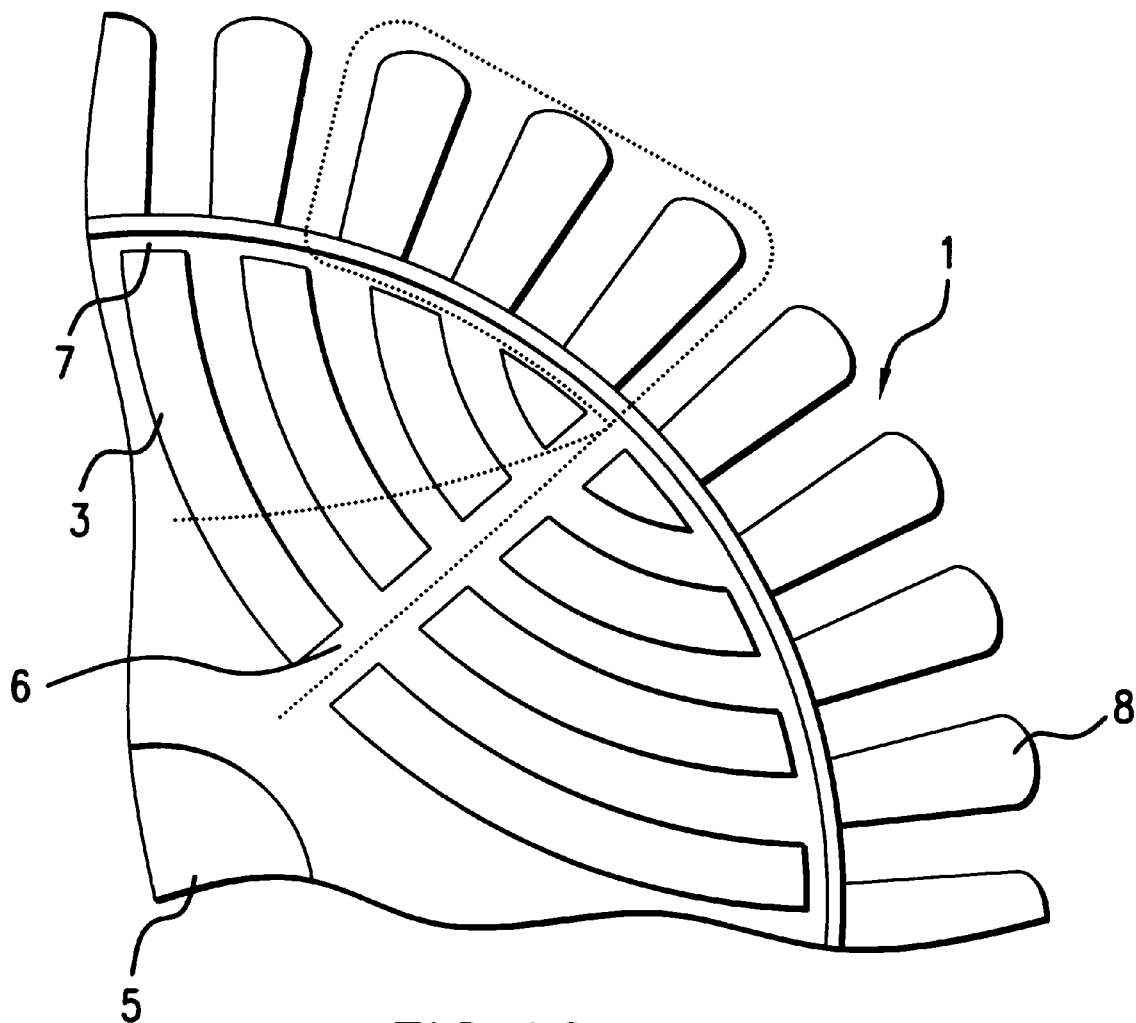
FIG. 19 is an enlarged view showing a 90° portion of the rotor of FIG. 18.

In addition to the above-described examples, other embodiments are also possible. For example, in the embodiment of FIG. 13, connecting portions 6 do not exist, and the permanent magnets 4 are disposed between the slits 3 so as to form one integral unit with the rotor 2. The permanent magnets 4 form the structures for withstanding the centrifugal force functioning just like the connecting portions 6. According to this arrangement, thin connecting portions 6 need not be formed, facilitating the manufacturing process and realizing cost reduction. Further, as recited in claim 6, the slits 3 may be partially or entirely filled with a non-magnetic material such as resin to strengthen the rotor structure. Rotor deformation and fatigue failure due to deformation of parts of a rotor can thereby be minimized. Moreover, although the above examples all refer to cases wherein only one array of connecting portions 6 is disposed between two adjacent magnetic poles, the number of arrays may be two, as shown in FIG. 14, or any number.

It should be understood that the present invention is not limited to the above embodiments and that many other variations may be devised. The number of rotor magnetic poles and the number of slits 3 may be any appropriate numbers. Whether the rotor 2 has a salient pole structure or a circular shape is not a limiting feature. Many possibilities exist for the number, size, shape, and arrangement of permanent magnets 4, and a permanent magnet 4 may, for example, be disposed aligned on one side of the connecting portion 6, leaving unoccupied connecting portion only on the other side. The orientation of the poles of the permanent magnets 4 is not necessarily in the direction along or perpendicular to the split magnetic paths, but may be in any direction as long as saturation of the connecting portions 6 is substantially achieved.

Figure 20:
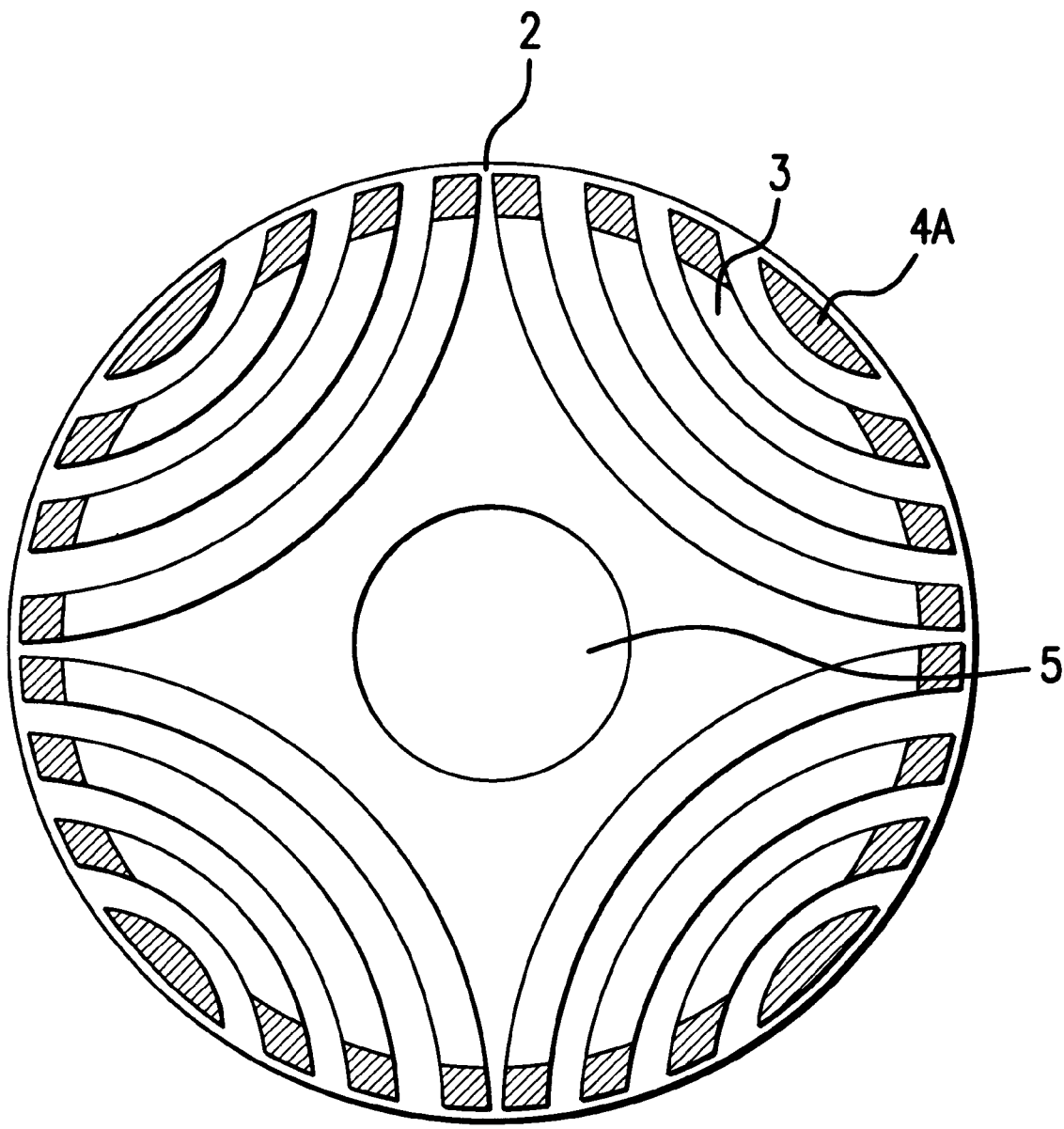
FIG. 20 is a cross-sectional view illustrating a further example rotor of a conventional reluctance motor.

In the ways described above, in comparison with the conventional motor with magnets on the periphery portion as illustrated in FIG. 20, the present invention accomplishes improvement in the reluctance motor characteristic using fewer magnets and, accordingly, involving lesser costs related to permanent magnet materials and assembly. Further, by incorporating the torque ripple reduction techniques, concavities can be formed at the borderline areas of the rotor magnetic poles to decrease leaking magnetic flux, and the permanent magnets 4A in FIG. 20 are therefore no longer necessary. By strengthening the connecting portions 6, a stronger rotor structure can be obtained. Accordingly, a more practical motor is provided by the present invention. Moreover, it should be noted that the present invention does not change the basic reluctance motor characteristics. The improved motor maintains the structure and characteristics on which a field weakening control can be performed.

In applications wherein the mechanical strength of a reluctance motor must be particularly large (for example, in applications in which a large impact may be applied or load is repeatedly applied causing a possible fatigue failure), a rotor may be effectively strengthened by filling a non-magnetic material such as resin in the slits between the split magnetic paths. For example, side walls may be formed on the split magnetic paths, and a resin material may be filled between the walls, allowing each split magnetic path and resin material to mechanically or adhesively link with one another. A rotor can thus be additionally strengthened.

According to the reluctance motor of the present invention, by disposing permanent magnets on the connecting portions linking a plurality of different split magnetic paths to one another in the rotor, leaking magnetic flux can be reduced, and generated torque can therefore be increased. During rotation at a high speed, as reactive voltage is decreased, the power factor is improved, achieving reduction in the capacitance of the drive device.

Rotor mechanical strength can be effectively enhanced because increases in the widths of the connecting portions can be made on the premise that leaking magnetic flux can be minimized. The reluctance motor can therefore be driven to rotate to higher speeds.

By implementing the techniques of coil winding, rotor shape selection, and skewing, torque ripples that particularly increase when permanent magnets are disposed can be reduced. Accordingly, a practical reluctance motor that can obtain large torque while reducing torque ripples is provided.

The rotor mechanical strength can be increased by filling a non-magnetic material such as resin in the slits between the split magnetic paths, allowing the rotor to be used in applications in which a large impact may be applied or wherein load is repeatedly applied.

What is claimed is:

1. A multi-phase reluctance motor, comprising:
   a stator including a plurality of slots for winding coils, the slots disposed on an inner circumference of the stator; and
   a rotor rotatably supported on the inner circumference of the stator, said rotor comprising
      a plurality of magnetic flux blocking means provided for each magnetic pole, constructed from spacing or a non-magnetic member between the magnetic poles adjacent to the rotor;
      a plurality of split magnetic paths, magnetically separated by being surrounded by said magnetic flux blocking means, for creating a plurality of magnetic poles on the rotor, with at least four split magnetic paths provided for each magnetic pole;
   connecting portions for mechanically linking said split magnetic paths to one another; and
   permanent magnets disposed in approximate centers of said split magnetic paths near borderline areas between adjacent magnetic poles in an internal portion of said magnetic flux blocking means, with the volume of said permanent magnets being less than the volume of the spacing portion of the intersection between said magnetic flux blocking means and the cylindrical space in which the rotor effectively operates.

2. The reluctance motor defined in claim 1, wherein:
   the permanent magnets are provided in a number identical to number of the magnetic poles, and arranged in the internal portion of the rotor near the borderline areas between the magnetic poles.

3. The reluctance motor defined in claim 1, wherein:
   each of the slots in the stator is wound with a coil of a corresponding phase such that, when multi-phase sinusoidal current is made to flow in the slots through the coils, vector phase and amplitude expressed by products of number of coil turns and amount of passing current, namely, ampere-turns, become almost identical for each of the slots.

4. The reluctance motor defined in claim 1, wherein:
   in the rotor including the plurality of magnetic poles, centers of the magnetic poles are shifted from equally-spaced positions, along rotor rotational direction by a distance of NN/NR of one slot pitch of the stator, NN being an integer determined for each of the magnetic poles, two or more different integers existing as NN values for all of the rotor magnetic poles, NR being a single integer unique to the rotor indicating a type of the shift of the rotor magnetic poles along the rotor rotational direction.

5. The reluctance motor defined in claim 4, wherein:

position of the rotor relative to the stator is skewed along the rotor rotational direction by an angle of (slot pitch/2) or smaller, or, alternatively, the rotor or the stator is divided into two or more sections in rotor axial direction, and the sections are shifted relative to one another along the rotor rotational direction so as to obtain an effect similar to that obtained by the skew.

6. The reluctance motor defined in claim 1, wherein:

a non-magnetic material such as resin is installed in slits between the split magnetic paths.

7. A multi-phase reluctance motor, comprising:

a stator including a plurality of slots for winding coils, the slots disposed on an inner circumference of the stator; and a rotor rotatably supported on the inner circumference of the stator, said rotor comprising
- a plurality of magnetically separated split magnetic paths for creating a plurality of magnetic poles on the rotor;

connecting portions that mechanically link said split magnetic paths to one another; and permanent magnets disposed in approximate centers of said split magnetic paths near borderline areas between adjacent magnetic poles in an internal portion of the rotor, wherein each of the slots in the stator is wound with a coil of a corresponding phase such that, when multi-phase sinusoidal current is made to flow in the slots through the coils, vector phase and amplitude expressed by products of number of coil turns and amount of passing current, namely, ampere-turns, become almost identical for each of the slots.

8. A multi-phase reluctance motor, comprising:

a stator including a plurality of slots for winding coils, the slots disposed on an inner circumference of the stator; and a rotor rotatably supported on the inner circumference of the stator, said rotor comprising
- a plurality of magnetically separated split magnetic paths for creating a plurality of magnetic poles on the rotor;

connecting portions for that mechanically link said split magnetic paths to one another; and permanent magnets disposed in approximate centers of said split magnetic paths near borderline areas between adjacent magnetic poles in an internal portion of the rotor, wherein in the rotor including the plurality of magnetic poles, centers of the magnetic poles are shifted from equally-spaced positions, along rotor rotational direction by a distance of NN/NR of one slot pitch of the stator, NN being an integer determined for each of the magnetic poles, two or more different integers existing as NN values for all of the rotor magnetic poles, NR being a single integer unique to the rotor indicating a type of the shift of the rotor magnetic poles along the rotor rotational direction.

9. The reluctance motor defined in claim 8, wherein:

position of the rotor relative to the stator is skewed along the rotor rotational direction by an angle of (slot pitch/2) or smaller, or, alternatively, the rotor or the stator is divided into two or more sections in rotor axial direction, and the sections are shifted relative to one another along the rotor rotational direction so as to obtain an effect similar to that obtained by the skew.

* * * * *